INVENTORS
CHESTER G. SEARS
GRANT J. BUTTERWORTH

Nov. 26, 1963

C. G. SEARS ETAL 3,112,078

CRUSHING AND SCREENING PLANT

Original Filed May 3, 1957

M — ⊠ ⊠ ⊠ SCALPING SCREEN AHEAD OF JAW CRUSHER.
⊠ ⊠ ⊠ (MUST BE LARGER THAN MESH OF MAIN PRODUCT SCREEN)

$M^1$ — ○ ○ ○ MAIN PRODUCT SCREEN
○ ○ ○ TAKEN OUT ON CONVEYOR "W"

$M^2$ — ⨯⨯⨯⨯⨯ SAND PRODUCT SCREEN (MUST BE OF SMALLER MESH THAN MAIN PRODUCT SCREEN.) TAKEN OUT ON CONVEYOR "Z"

$M^3$ — ●●● 1ST CHIP PRODUCT SCREEN
●●● TAKEN OUT ON CONVEYOR "X"

$M^4$ — ▦▦ 2ND CHIP PRODUCT SCREEN (MUST BE OF LARGER MESH THAN 1ST CHIP PRODUCT SCREEN) TAKEN OUT ON CONVEYOR "Y"

$M^5$ — ‖‖‖‖ CARRYING DECK SCREEN (MUST BE OF SMALLER MESH THAN MAIN PRODUCT SCREEN.)

INVENTORS
CHESTER G. SEARS
GRANT J. BUTTERWORTH
BY
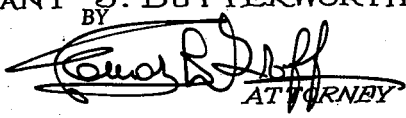
ATTORNEY

United States Patent Office 3,112,078
Patented Nov. 26, 1963

3,112,078
CRUSHING AND SCREENING PLANT
Chester G. Sears and Grant J. Butterworth, Minneapolis, Minn., assignors to Poor & Company, Chicago, Ill., a corporation of Delaware
Original application May 3, 1957, Ser. No. 656,804, now Patent No. 3,016,203, dated Jan. 9, 1962. Divided and this application Oct. 26, 1961, Ser. No. 147,961
1 Claim. (Cl. 241—76)

This application is a division of our application Serial No. 565,804, filed May 3, 1957, now Pat. No. 3,016,203, dated January 9, 1962, and is directed to that species where the recovery of materials may be effected by chutes at the same side of the carry deck as distinguished from opposite sides.

The invention relates to a method and apparatus for crushing, screening and grading pit or quarry material, through the use of screens of different size mesh, into aggregates of selected sizes or grades ranging from a main product to be recovered through intervening stages to provide intermediate products and a terminal product such as sand.

Plants of the type set forth having the capacity to produce multiple aggregate products, may include by way of example, a top or first deck, a second or carry deck, a third deck, and a bottom or fourth deck, all of which decks are subjected to a vibrating or shaking movement so that the material will be classified in accordance with the size of the mesh and recovered as desired.

Apparatus of the type referred to may, as shown by Patent No. 2,276,333, dated March 17, 1942, include a primary or jaw crusher for reducing large particles and a secondary or roll crusher for reducing smaller particles, both mounted on a single chassis, and each intended for appropriately reducing the material not able to pass through the superimposed screens of the multiple deck by continually recirculating the material which is rejected or refused passage by the mesh of the product screens.

As an example of prior apparatus, it has been customary for the mesh of the screen on the third or feed deck, which receives the material directly from the pit conveyor, to be of a size to pass the first or main product to be recovered. Thus, the main product size material was screened out immediately but all material above the product size, including both secondary fines and coarser material, was compelled to pass through the jaw crusher. In other words, in this arrangement, all material above the size refused passage by the main product size screen, including that which could be conveniently handled by the roll crusher, was discharged into the jaw crusher. This resulted in choking and thus reducing the efficiency of the jaw crusher because such material of reduced size occupied valuable space that would otherwise give higher production capacity to said jaw crusher.

Accordingly, one of the objects of the invention is to avoid the condition above described and provide a multiple aggregate plant wherein the screens discharge selected products at different points from either the ends or the same side, and wherein a receiving screen constituting for example, the third deck, is in part or throughout of a scalper mesh having the capacity to by-pass material oversized in relation to the first or main product, around the jaw crusher and into the recirculating system to the top deck where it is fed back to the roll crusher.

Another object of the invention is to provide a multiple deck screen unit wherein each deck may employ screens of different size mesh, or the screen of a particular deck may be of the same mesh throughout. These arrangements make it possible to recover a greater range of products and also greatly increase the screening capacity while maintaining the decks within the practical physical limits of the length available. In other words, the present invention provides a screening plant that has higher capacities and more product sizes than are possible with conventional top feed type gravel plants.

A still further object is to provide a plant of maximum flexibility for obtaining multiple product sizes through the use of a four deck vibrating screen utilizing a unique spouting system, and also wherein selected material from the second or carry deck is removed from the same side of the plant in which the screens of the several decks are of different mesh and so arranged as to produce up to four product sizes simultaneously.

With the above and other objects in view which will more readily appear as the nature of the invention is better understood, the same consists in the novel construction, combination, and arrangement of parts hereinafter more fully described and illustrated in the accompanying drawings, in which:

FIG. 3 is a table illustrating diagrammatically six different mesh sizes by the use of symbols identifying the particular product to be recovered.

Similar reference characters designate corresponding parts throughout the several figures of the drawing.

Figure 1:
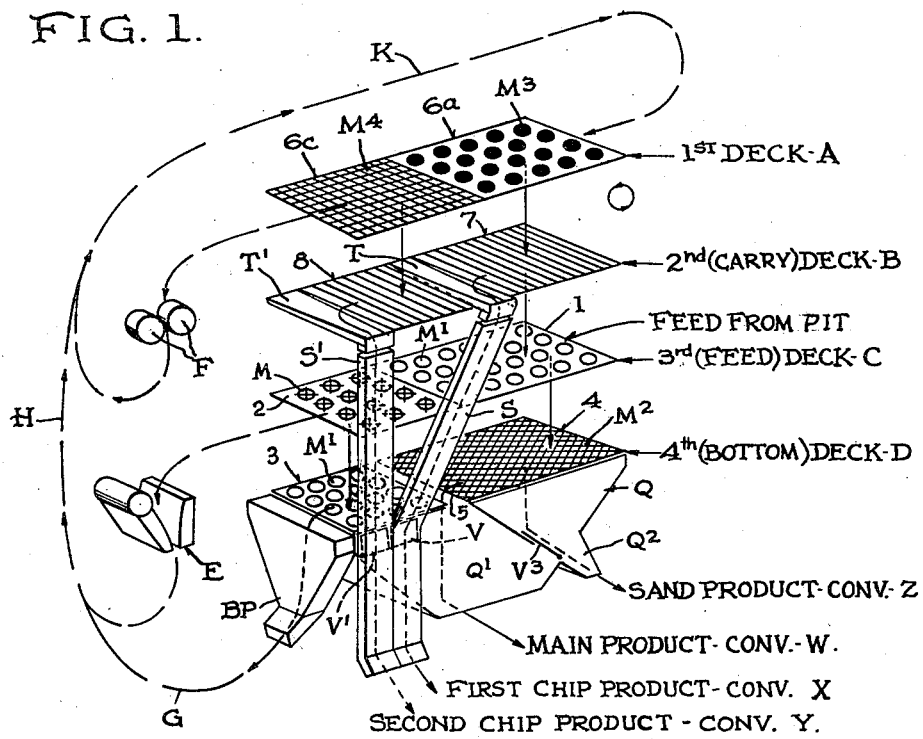
FIGURE 1 is a diagrammatic view illustrating a multiple deck and screen arrangement for recovering four products, namely a main product from the pit run, a first chip product as a result of a crusher run, a second chip product as a result of a crusher run, and a further product such as sand and having the capability of delivering two different products from the same side of the apparatus.

Where the several decks have similar screens, the same reference will be used, but, when a deck has screen sections of different mesh, the reference for a previously used section will bear an appropriate exponent, with a view to simplifying the description.

Also, in all views the arrows on screens indicate the passage or flow of material through a screen; the dotted lines in the spouts and bins indicate product paths; and the broken dash lines with arrows indicate the paths of products being recirculated.

Referring to the drawings, the invention includes a stack of vibratory screens disposed at different levels and adapted to feed material from a receiving end to a discharge end. The mounting and vibrating details are conventional and may vary within the industry.

In both of the figures of the drawing, the superimposed decks are designated as follows:

A at the top of the stack constitutes the top or first deck; the second deck B beneath A provides the so-called carry deck; the third deck C forms the receiving deck onto which the run of the pit material is dumped; the fourth or bottom deck is designated as D. The upper decks A and B together form a pair for handling only crushed material and the lower decks C and D form a pair for handling pit material.

Each of the decks A, B, C, D, with respect to each other, may be provided with sections of different mesh depending upon the product to be recovered at the stage of material processing. Also, each deck may comprise sections of different mesh.

By way of illustrating the screens of different size mesh, reference may be made to the fact that each mesh size is designated by the letters M, $M^1$, $M^2$, $M^3$, $M^4$, and $M^5$ as shown and described in FIG. 3.

Pit run material deposited on the third or feed deck C is screened out in a manner so that particles too large for the mesh or meshes of the deck C move to the aforesaid jaw crusher E discharging the material into the recirculating conveyor system G, H, K, carrying the material to the top or first deck A which in turn feeds the roll crusher F. The bottom deck D is provided with mesh $M^1$ which permits the passage of product size material but also in section 3 serves as a scalping mesh to conduct or transfer particles too coarse for said product size, but so fine as to clog or choke the jaw crusher through a bypass BP into the recirculating system.

FIGURE 1 illustrates the top deck A having two sections $6a$ and $6c$, the first section having a mesh $M^3$ of a size to pass a first chip product while the second section $6c$ is provided with a mesh $M^4$ to recover a second chip product. The product sizes passing through sections $6a$ and $6c$ drop to related subjacent screen sections 7 and 8 of the carry deck B. Any particles denied passage through the mesh $M^4$ of section $6c$ are returned to the roll crusher F and thence back into the recirculating system G, H, K. The deck B is provided with two transversely disposed troughs T and T' respectively, inclined to the same side or edge of the deck B, to communicate with the spouts S and $S^1$ containing respectively the valves V and $V^1$ whose position will control access to the compartment $Q^1$ of the hopper Q, or alternatively permit the material to pass on through the bottom portions of the chutes and on to suitable conveyors for conducting the recovered material to the point of use. Also, through the selective manipulation of valves V and $V^1$ the recoverable products may be routed to carry-off conveyors W, X, Y.

Figure 2:
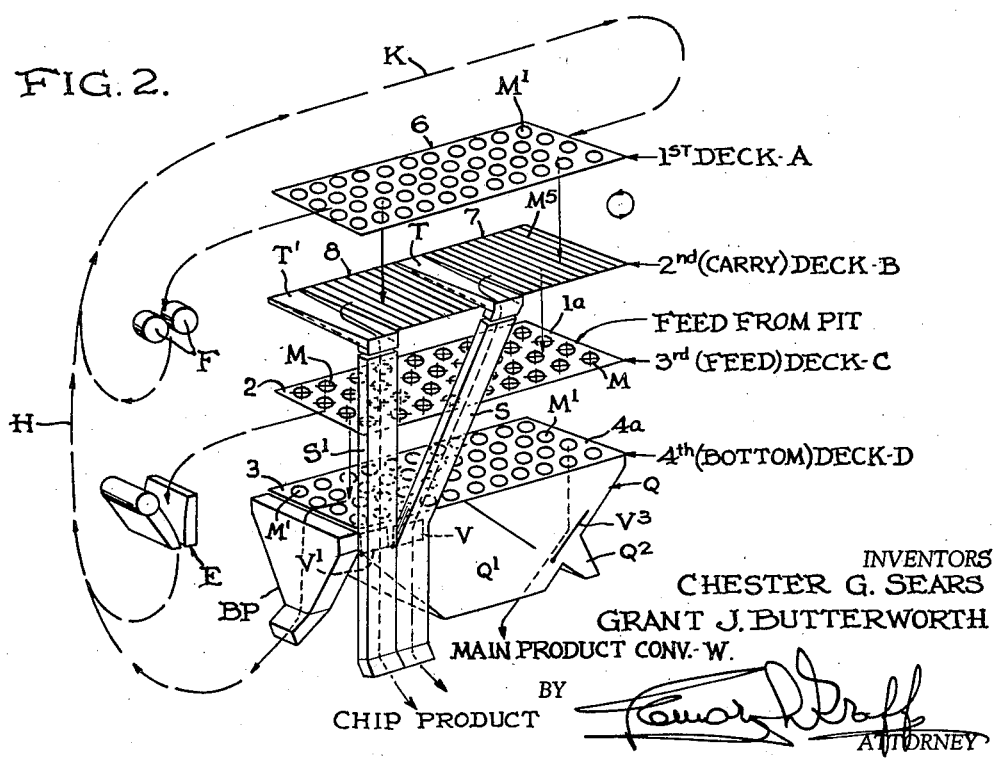
FIGURE 2 is a diagrammatic view similar to FIGURE 1, wherein the screen deck arrangement corresponds to FIGURE 1 with the exception that the top or first deck has mesh of uniform size throughout so that the same size products are recovered on the second or carry deck and such products are removed from said carry deck at the same side of the apparatus.

Referring now to FIGURE 2, it will be observed that the deck A is provided with a screen 6 of uniform mesh $M^1$ throughout so that it passes the screened product to the sections 7 and 8 of the carry deck B along the path of the arrows. The deck B of FIGURE 2 like that of FIGURE 1 has the transfer troughs T and T' inclined to the same side or edge of the apparatus and each communicates with the related spouts S and $S^1$ having valves V and $V^1$ similar to their counterparts in FIGURE 1.

According to the arrangement in FIGURE 2, only a main product is delivered to the take-off conveyor W, because the receiving deck C has a single screen $1a$ of uniform scalping mesh which passes all product size material onto the single section $4a$ of deck D also having uniform mesh M' throughout. Thus, the main product may be gathered in the main compartment of the hopper Q whose valve $V^3$ has its sand outlet spout closed. All material too coarse for the main product size but so fine that it would choke the jaw crusher E if it went along with the material from deck C is by-passed through the chute BP to the conveyor G. Any material recirculated through the conveyor system G, H, K, onto the screen 6 having the mesh $M^1$ will immediately pass main product size particles to deck B. The said main particles will pass to the screen sections 7 and 8, and the main product from section 7 will fall into trough T and thence to the chute S whose damper V is positioned so as to direct the main product into compartment $Q^1$ of the hopper Q, the valve $V^3$ being closed to block off the spout $Q^2$.

From the foregoing it will now be seen that in FIGURE 2 the carry deck is provided with a uniform mesh and transverse troughs T and T', each communicating with a related spout S or $S^1$ to enable the operator to route the product recovered by deck B either to a hopper compartment or to a conveyor.

We claim:

A crushing and screening plant for recovering main and other size products from pit run material, including, in combination, a top deck, a carry deck below the top deck, a feed deck below the carry deck for receiving pit run material, a bottom deck including a main product mesh and located below the feed deck, a conveyor system for carrying material to be screened from the bottom deck and feed deck to the top deck, a first crusher located in said conveyor system in receiving relation to the feed deck and also in discharging relation to said conveyor system, a second crusher in both feeding and receiving relation to the top deck through the said conveyor system, a scalping mesh in the said feed deck and of a size to refuse passage of material oversize therefor and to pass said oversize material directly to the first crusher and also permit passage of smaller size material to said main product mesh of the bottom deck, means for diverting only material passing through the scalping mesh of the feed deck and falling onto the bottom deck into the conveyor system, thereby to pass through the first crusher for size reduction and to enter the conveyor system to be carried to and deposited on the top deck, screen sections in the carry deck of the same mesh but of smaller size than the main product mesh of the bottom deck, troughs separating said sections and having imperforate bottoms inclined in the same direction to discharge at the same side of the plant, and chutes in receiving relation to the discharge ends of said troughs.

References Cited in the file of this patent

UNITED STATES PATENTS

| 310,734 | Sherman | Jan. 13, 1885 |
| 693,019 | Holmes | Feb. 11, 1902 |
| 2,276,333 | Ovestrud | Mar. 17, 1942 |
| 2,864,561 | Mork | Dec. 16, 1958 |